March 18, 1952   R. E. SANFORD   2,589,291
FLUID ACTUATED CLUTCH
Filed July 16, 1945
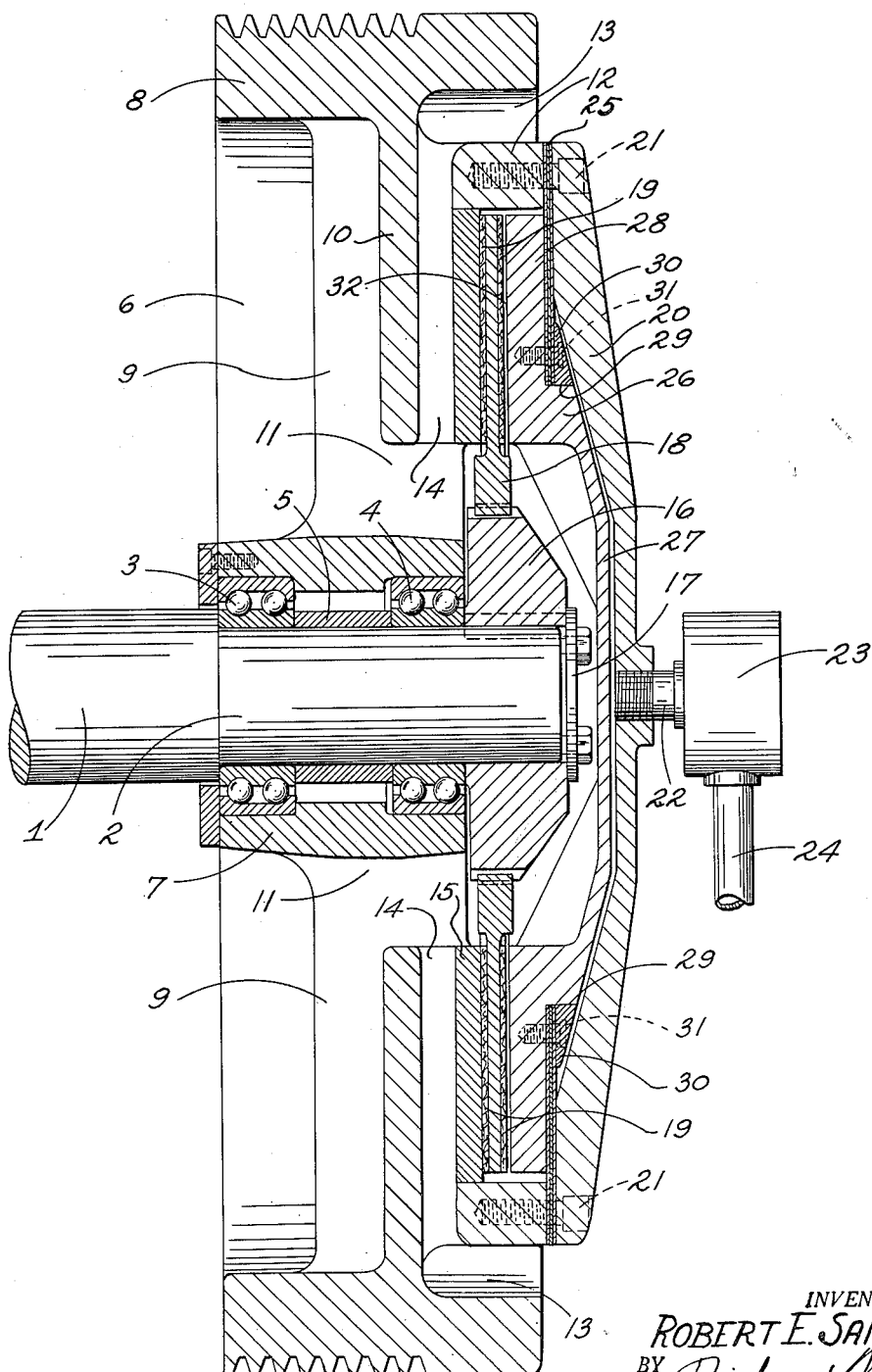
INVENTOR.
ROBERT E. SANFORD
BY Richey + Watts
ATTORNEYS Patented Mar. 18, 1952

2,589,291

UNITED STATES PATENT OFFICE 2,589,291

FLUID ACTUATED CLUTCH

Robert E. Sanford, Tiffin, Ohio, assignor to The National Machinery Company, Tiffin, Ohio, a corporation of Ohio Application July 16, 1945, Serial No. 605,210

10 Claims. (Cl. 192—88)

This invention relates to friction devices and particularly to a fluid actuated friction clutch for presses, forging machines and similar heavy duty machinery. The principal object of this invention is to seal the expansible chamber of a fluid operated clutch without the use of packing or sliding contacts between the parts. Another object is to accurately center and guide the piston element of the expansible chamber of such a clutch without the use of slidable bearing surfaces or supports. Another object is to obtain improved smoothness and uniformity of engagement of the friction surfaces by supporting and transmitting torque to an axially movable friction element, which in the disclosed embodiment is integral with the piston, by means of a radially extending resilient metal diaphragm which is stretched within the elastic limit of the metal during the movement of the friction element from released to engaged position, thereby eliminating slidable keys and notches and any tendency to grab or cock from non-uniformities in the friction between such keys and notches. Supporting and transmitting torque to the friction element by the resiliently stretched diaphragm also results in cushioning the initial engagement of the friction surface. Other objects and advantages will appear from the following detailed description of a preferred embodiment of the invention.

In the accompanying drawing, the single figure is a vertical section through a clutch embodying this invention mounted on a fly wheel and arranged to couple the fly wheel to a shaft.

Referring to the drawing, the shaft 1, which may be the driven shaft of a forging machine, press or the like, is provided at its end with a reduced portion 2. Ball bearing seats 3 and 4 separated by a spacer 5 are assembled upon the portion 2 of the shaft. A fly wheel 6 is formed with a hub 7 engaging and supported by the ball bearings 3 and 4 and a rim 8 connected to the hub 7 by a series of spokes 9.

The fly wheel casting is formed with an annular web 10 depending from the rim 8 leaving spaces 11 through the wheel between the spokes and within the inner edge of the web 10. The wheel is also provided with a flange 12, preferably as an integral part of the casting, separated from the rim 8 by a cored out groove 13. A series of radial ribs 14 project from one face of the web 10 and are formed integrally with the flange 12. The faces of the ribs 14 are machined to provide a seat for a friction plate 15 which is secured within the flange 12 and against the ribs 14. The spaces between the ribs 14 and between the web 10 and the friction plate 15 provide a series of radial channels connecting the passages 11 with the annular groove 13 so that air may flow from adjacent the hub 7 of the fly wheel outwardly between the web 10 and the friction plate 15 and be discharged from the groove 13. This arrangement of the fly wheel for air cooling corresponds to the subject matter disclosed and claimed in the patents to Clouse No. 2,241,241 and Friedman No. 2,241,242.

A hub 16 is keyed to the outer end of the reduced portion 2 of the shaft and is held in place by a plate 17 bolted to the end of the shaft. In the arrangement disclosed plate 17 presses the hub 16 against the inner race of the ball bearing set 4, which thrusts through the spacer 5 against the inner race of the ball bearing set 3, which in turn abuts the shoulder between the shaft 1 and the reduced portion 2.

A clutch plate 18 is splined to the periphery of the hub 16 so as to be free for movement axially with respect to the shaft 1. The clutch plate 18 may be provided with any suitable friction facings 19, one of which is adapted to bear against the friction plate 15 carried by the fly wheel 6.

A closure plate 20 has its rim secured to the flange 12 of the fly wheel 6 by bolts or the like 21. A pipe 22 projects outwardly from the center of the plate 20 and supports a swivel coupling 23 of any desired construction through which the pipe 22 is connected to a supply pipe 24, arranged to supply pressure fluid for operating the clutch.

An annular diaphragm 25, which preferably consists of a plurality of resilient thin sheet steel laminae, has its periphery secured between the flange 12 and the rim of the plate 20 in fluid-tight relation to the plate 20. A piston 26 is arranged between the plate 20 and the movable clutch plate 18. The piston 26 has a solid central portion 27 which preferably follows the contour of the inner surface of the plate 20 so as to leave a relatively small space therebetween, and a rim in the form of an annular flange 28 joined to the central portion 27 through a shoulder 29. The inner edge of the laminated diaphragm 25 is secured to the flange 28 of the piston by a clamping ring 30 resting on the shoulder 29 and bolts 31 extending through the ring 30 and the inner portion of the diaphragm 25 into the flange 28 of the piston. Thus the diaphragm 25 is secured in fluid-tight relation to the flange 28 so that the space between the inner face of the plate 20 and the outer face of the piston 26 is completely sealed except for the fluid supply pipe 22 entering through the center of the plate 20.

The diaphragm 25 is made of such strength as to be capable of supporting and centering the piston 26. In normal position the diaphragm 25 is flat and supports the piston 26 in the position shown in the drawing with the inner face 32 of the flange 28 spaced slightly from the adjacent friction surface 19 of the movable clutch plate 18. The radial length of the diaphragm 25 between the bolts 21 and the bolts 31 is proportioned with respect to the amount of movement of the piston 26 required to fully engage the clutch so that the increase in length of the diaphragm between the bolts 21 and 31 required by the movement of the piston to clutch engaging position is within the elastic limit of the metal of the diaphragm. In this manner the piston 26 is firmly supported and centered with respect to the fly wheel 6 when the clutch is disengaged and returns to this position and condition after each engagement of the clutch without permanently distorting or stretching the diaphragm itself.

In operation, with the clutch in disengaged position as shown in the drawing, the fly wheel 6 may be driven in any suitable way, as by belting engaging the periphery of the rim 8. The fly wheel turns with respect to the shaft 1 upon the ball bearings 3 and 4, there being sufficient space between the inner face of the flange 28 and the outer face of the friction plate 15 to permit the movable clutch plate 18 to center itself between and out of engagement with these two friction faces. When it is desired to couple the fly wheel to the shaft 1, fluid under pressure is admitted through the pipes 22 and 24 into the space between the plate 20 and the piston 26. The pressure of the fluid forces the piston 26 axially inward, compressing the friction surfaces 19 of the clutch plate 18 between the inner face of the flange 28 and the outer face of the friction plate 15, so that the parts are coupled and the motion of the fly wheel is transmitted through the clutch plate 18 to the hub 16 and thence to the shaft 1. In this movement to closed position the material of the diaphragm 25 between the bolts 21 and the bolts 31 elongates slightly, this elongation, as pointed out above, being within the elastic limit of the material of the diaphragm 25. In addition, the transmission of torque from the flange 12 to the flange 28 through the resiliently stretched diaphragm 25 results in cushioning the initial engagement of the friction surface. The elimination of guiding and torque transmitting pins or keys eliminates any danger of grabbing or cocking of the piston 26 or the flange 28 from non-uniformities in sliding friction. When it is desired to release the clutch the pressure fluid is exhausted through the pipes 22 and 24, permitting the piston 26 to return to the position illustrated in the drawing without deformation or damage to the diaphragm 25. The resilience of the steel diaphragm 25 returns the piston to released position when the pressure is exhausted.

It is preferred to make the diaphragm 25 of a plurality of steel laminae so as to reduce the resistance of the diaphragm to bending when the piston moves to clutch engaging position, while providing the necessary strength to firmly support the piston 26 in properly centered relation with respect to the fly wheel at all times.

Although a preferred embodiment of the invention has been described in considerable detail, it will be understood that many modifications and rearrangements of the parts may be resorted to without departing from the scope of the invention as defined in the following claims.

I claim:

1. A fluid actuated clutch comprising driving and driven members, engageable friction elements including an abutment carried by one of said members and a clutch disc carried by the other of said members movable toward and away from said abutment, fluid pressure motor carried by said one member including a cover plate and a piston, said piston having an annular friction surface engageable with said clutch disc, a combined seal and return spring comprising a resilient annular metal diaphragm secured to said cover plate and to said piston, said diaphragm lying substantially in a plane when said clutch is released and resiliently holding said annular friction surface away from said clutch plate, said piston extending across and closing the aperture in said annular diaphragm and means for admitting pressure fluid between said cover plate and said piston to move said piston axially and force said friction elements into clutching engagement, the relation between the radial dimension of said diaphragm and the extent of movement of said piston from released to engaged position being such that the stretching of said diaphragm during such movement is within the elastic limit of the metal thereof.

2. In a device of the class described, the combination of elements relatively movable from engaged to released position, and means for effecting such relative movement comprising a fluid pressure motor including a rigid plate, a rigid piston operatively engaging said elements, a combined seal and return spring comprising an annular resilient laminated steel diaphragm having its outer edge portion secured to said plate and its inner edge portion secured solely to said piston and normally lying substantially in a plane when said elements are in released position and resiliently holding said piston spaced from said elements, and means for admitting pressure fluid between said plate and said piston to move said piston axially away from said plate, said diaphragm radially locating said piston, said piston motion radially stretching the metal of said diaphragm within the elastic limit thereof.

3. A fluid actuated clutch comprising driving and driven members carrying cooperating clutch elements, a cover plate secured to one of said members, a resilient metal diaphragm having a substantially circular outer edge portion secured to said one member, a piston secured to said diaphragm radially inward from the points of securement of said diaphragm to said one member and encompassing the axis of said members, the entire portion of said diaphragm disposed radially between its points of securement to said one member and to said piston lying normally in a single plane in released position of said clutch, said piston including rigidly connected axially spaced portions disposed on opposite sides of said plane, said piston being associated with said clutch elements to effect engagement thereof on movement of said piston away from said cover plate, the relation between the radial distance between the points of securement of the diaphragm to the piston and said one member, and the extent of movement of said piston from released to engaged position being such that the radial elongation of the diaphragm during such movement is within the elastic limit of the metal thereof.

4. A fluid actuated clutch comprising driving and driven members carrying cooperating clutch elements, a cover plate secured to one of said members, an anuular flexible diaphragm mounted by said one member and extending radially inwardly of the zone of securement of said cover plate, a piston secured to said diaphragm radially inwardly of the mounting zone of said diaphragm, said piston closing and extending entirely across the aperture in said annular diaphragm, said diaphragm serving to positively radially locate said piston relative to said one member and to said cover plate, said piston including means axially movable therewith and associated with said clutch elements to effect engagement thereof on movement of said piston away from said cover plate, said piston, diaphragm and cover plate defining a closed fluid space, and means for admitting pressure fluid to said space to move said piston and effect engagement of said clutch elements.

5. A fluid actuated clutch comprising driving and driven members carrying cooperating clutch elements, a cover plate secured to one of said members, an annular flexible diaphragm having its periphery clamped between said one member and said cover plate said diaphragm extending radially inwardly of the zone of securement of said cover plate, a piston secured to said diaphragm radially inwardly of the clamped zone of said diaphragm, said piston closing and extending entirely across the aperture in said annular diaphragm, said diaphragm serving to positively radially locate said piston relative to said one member and to said cover plate, said piston including means axially movable therewith and associated with said clutch elements to effect engagement thereof on movement of said piston away from said cover plate, said piston, diaphragm and cover plate defining a closed fluid space, and means for admitting pressure fluid to said space to move said piston and effect engagement of said clutch elements.

6. A fluid actuated clutch comprising driving and driven members carrying cooperating clutch elements, a cover plate secured to one of said members, an annular flexible diaphragm mounted by said one member and extending radially inwardly of the zone of securement of said cover plate, said diaphragm being arranged in a substantially radial plane, a piston secured to said diaphragm radially inwardly of the mounting zone of said diaphragm, said piston closing and extending entirely across the aperture of said annular diaphragm, said diaphragm serving to positively radially locate said piston relative to said one member and to said cover plate, said piston including means axially movable therewith and associated with said clutch elements to effect engagement thereof on movement of said piston away from said cover plate, said piston, diaphragm and cover plate defining a closed fluid space, and means for admitting pressure fluid to said space to move said piston and effect engagement of said clutch elements.

7. A fluid actuated clutch comprising driving and driven members carrying cooperating clutch elements, a cover plate secured to one of said members, an annular flexible diaphragm mounted by said one member and extending radially inwardly of the zone of securement of said cover plate, said diaphragm composed of steel laminae, a piston secured to said diaphragm radially inwardly of the mounting zone of said diaphragm, said piston closing and extending entirely across the aperture in said annular diaphragm, said diaphragm serving to positively radially locate said piston relative to said one member and to said cover plate, said piston including means axially movable therewith and associated with said clutch elements to effect engagement thereof on movement of said piston away from said cover plate, said piston, diaphragm and cover plate defining a closed fluid space, and means for admitting pressure fluid to said space to move said piston and effect engagement of said clutch elements.

8. A fluid actuated clutch comprising driving and driven members carrying cooperating clutch elements, a cover plate secured to one of said members, an annular resilient steel diaphragm mounted by said one member and extending radially inwardly of the zone of securement of said cover plate, a piston secured to said diaphragm radially inwardly of the mounting zone of said diaphragm, said piston closing and extending entirely across the aperture in said annular diaphragm, said diaphragm serving to positively radially locate said piston relative to said one member and to said cover plate, said piston including means axially movable therewith and associated with said clutch elements to effect engagement thereof on movement of said piston away from said cover plate, said piston, diaphragm and cover plate defining a closed fluid space, and means for admitting pressure fluid to said space to move said piston and effect engagement of said clutch elements by radially stretching the metal of said diaphragm.

9. A fluid actuated clutch comprising driving and driven members carrying annular cooperating clutch elements, a cover plate secured to one of said members, a piston comprising a unitary member having an outer annular portion for engaging said clutch elements and an imperforate central portion extending unitarily from said annular portion and bridging the clutch axis, an annular flexible diaphragm mounted at its outer periphery by said one member and having its inner periphery clamped to an intermediate zone of said piston on the side thereof axially away from said clutch elements, said piston, diaphragm and cover plate defining a closed fluid space, and means for admitting pressure fluid to said space to move said piston and effect engagement of said clutch elements.

10. In a device of the class described, a shaft, a wheel rotatably mounted on said shaft, a friction plate held against rotation with respect to said shaft, a friction element carried by said wheel and held against rotation with respect thereto positioned to engage one surface of said friction plate, a cover plate secured to said wheel, an annular resilient metal diaphragm having its outer edge portion secured to said wheel, a piston positioned between said friction plate and said cover plate, the inner edge of said diaphragm being secured to said piston, said piston having an annular friction surface adapted to engage the other surface of said friction plate, said diaphragm normally lying in a plane disposed radially with respect to said shaft with said annular friction surface of said piston spaced from said friction plate and holding said piston against rotation with respect to said wheel, means for admitting fluid under pressure between said cover plate and said piston to move said piston to engaged position and to clamp said friction plate between said friction element and said friction surface, said diaphragm in engaged position being resiliently stretched into frustro-conical shape and transmitting torque through the resiliently stretched metal thereof between said wheel and said friction surface.

ROBERT E. SANFORD.

REFERENCES CITED

The following references are of record in the file of this patent:

UNITED STATES PATENTS

| Number | Name | Date |
| --- | --- | --- |
| 427,085 | Jones | May 6, 1890 |
| 818,828 | Kasson | Apr. 24, 1906 |
| 848,379 | Lake | Mar. 26, 1907 |
| 848,380 | Lake | Mar. 26, 1907 |
| 993,825 | Cramer | May 30, 1911 |
| 1,360,394 | Gordon | Nov. 30, 1920 |
| 1,465,431 | Gordon | Aug. 21, 1923 |
| 1,964,745 | Sauzedde | July 3, 1934 |
| 2,074,738 | Aikman | Mar. 23, 1937 |
| 2,138,393 | Wichtendahl | Nov. 29, 1938 |
| 2,241,241 | Clause | May 6, 1941 |